Patented July 13, 1954

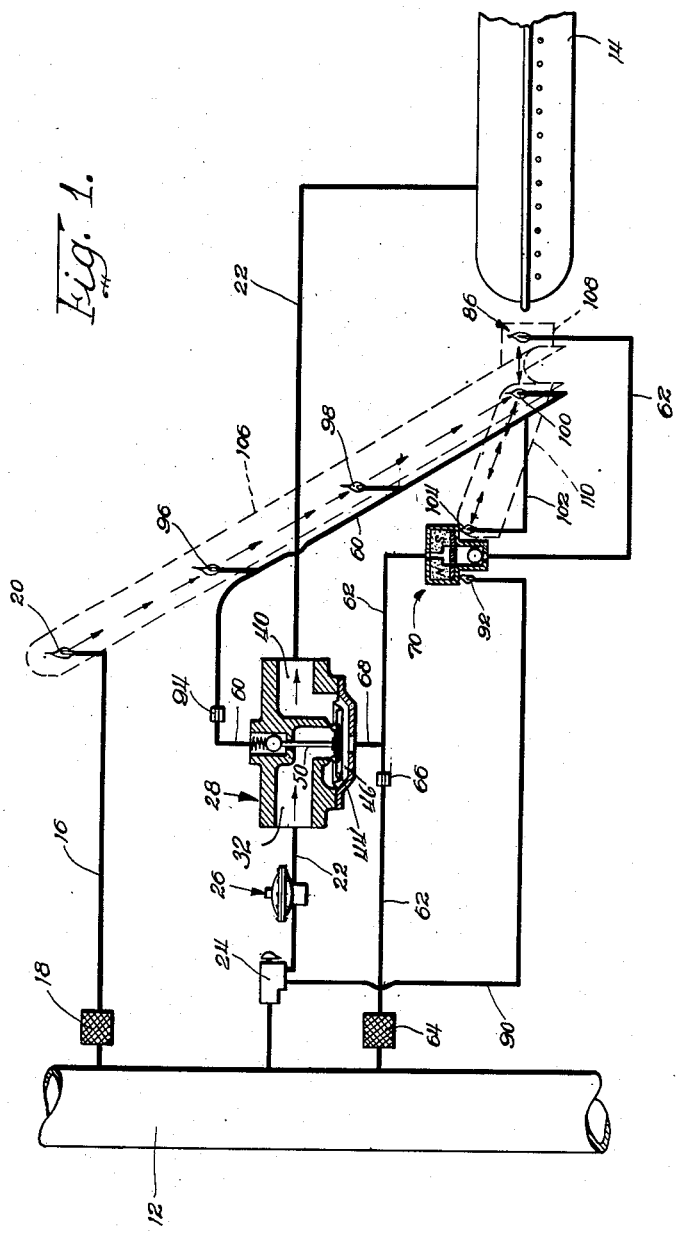

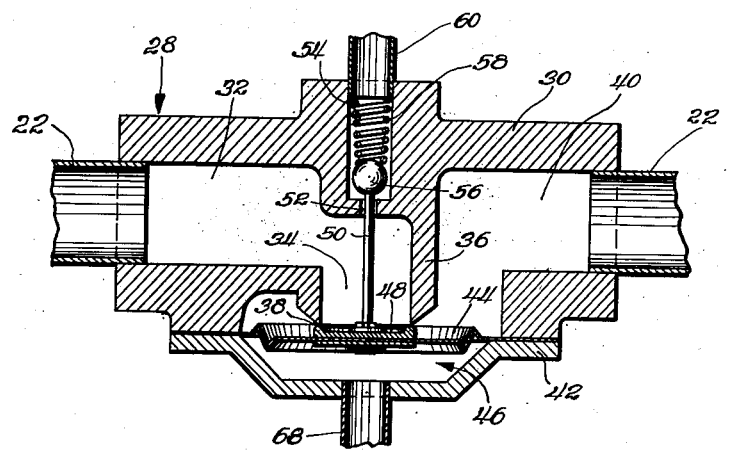
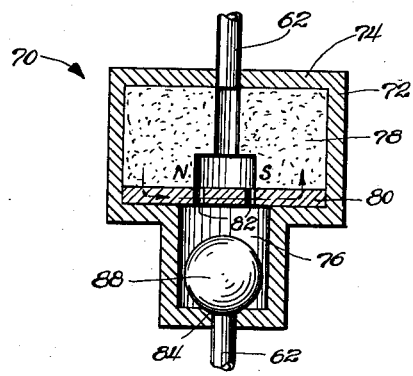
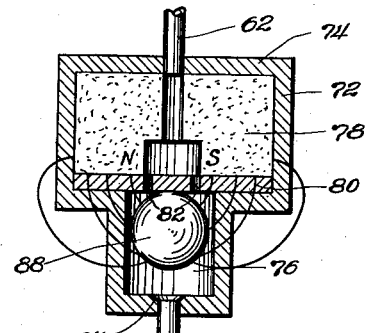
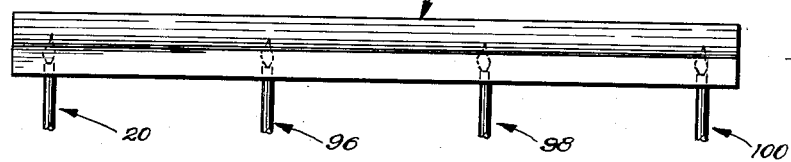
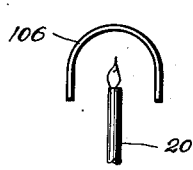

2,683,486

UNITED STATES PATENT OFFICE 2,683,486

BOOSTER PILOT

Robert A. Wittmann, Chicago, Ill.

Application October 12, 1948, Serial No. 54,173

6 Claims. (Cl. 158—143)

This invention relates to a new and novel means for accelerating both the heating and cooling action of a heat responsive element as preferably used in an automatic control system.

The heat responsive element referred to may be in the form of a valve or switch which is operated in response to the existence of proper, or improper, operating conditions of the device which the system controls.

The present invention is applicable to a gas burner, but it is also applicable to other devices, and kinds of devices.

Specifically, in the case of a gas burner, the heat responsive device is a valve which is opened and closed in response to heat, and controls the flow of gas so that gas flows to the burner only when it is assured that the gas will be ignited when it reaches the burner.

More specifically, the heat responsive device is a valve subjected to a pilot burner which is open when the pilot burner is burning and when a pilot burner for the burner is also burning, and of course is closed when the pilot burners are extinguished.

An objection to previously known devices of this general nature is that the valve opens or closes too slowly, or too fast; for example, if the rate of heat input to the heat responsive element is high the latter will reach its operating temperature rapidly, but its temperature will become excessive and the time for it to cool back to the operating temperature will be too long; on the other hand, if the rate of heat input is low, the heat responsive element will be slow in reaching its operating temperature, but it will however cool rapidly on the cooling cycle.

An object therefore of the present invention is the provision of means by the use of which the heat responsive device will both heat and cool rapidly in its respective cycle.

Another object is the provision of means by the use of which the extent to which the heat responsive element may overshoot its operating range will be kept at a minimum.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a diagrammatic view of the device of the present invention applied to a gas burner;

Figure 2 is an enlarged semi-diagrammatic view of one of the valves used in the arrangement shown in Figure 1;

Figures 3 and 4 are enlarged semi-diagrammatic views of another valve used in the arrangement of Figure 1, and Figures 5 and 6 are detailed views of the flame propagation tube.

The arrangement of elements used in the device of the present invention illustrates the invention as applied to a gas burner and the particular arrangement is known as single point ignition whereby a number of different pilot burners and burners are all ignited from a main constantly burning pilot burner. Although the invention as illustrated is applied to a gas burner, it will be understood that it can also be applied to other types of automatic control using other sources of thermal energy.

Referring in detail to the drawings, a gas main is illustrated at 12 and a main gas burner at 14. The burner 14 may be employed in an oven such as a domestic oven. Leading from the gas main 12 is a pilot line 16 having a filter 18 interposed therein. The pilot burner line 16 terminates in a pilot burner 20 which will be referred to as a constant burning top burner pilot. The pilot burner 20 is not affected by the controls forming the present invention and serves the purpose of being constantly available for igniting other pilot burners and the burners. Leading also from the gas main 12 is a line 22 having an oven thermostat 24 therein. The oven thermostat is for the purpose of turning the gas on and off manually and regulating the heat of the appliance. A gas pressure regulator 26 is also interposed in the line 22. The gas pressure regulator is for the purpose of maintaining even and constant pressure of the gas flowing through the line; the gas pressure regulator is not essential, and may be omitted if desired. The line 22 next leads to a diaphragm valve 28. For convenience herein, the valve 28 may also be termed the main valve. Reference may be had to Figure 2 which shows on a greater scale the construction of the valve 28. The valve 28 includes a housing 30 having an inlet passage 32 into which the line 22 enters. The passage 32 continues into a vertical passage 34 formed by a tubular wall 36 having a downwardly facing valve seat 38. On the other end of the valve is an outlet passage 40 adapted to have communication with the passage 34 under certain conditions. The line 22 continues from the passage 40 to the main burner 14. The bottom of the valve housing 30 is closed by a plate 42 which secures a diaphragm 44 between itself and the main portion of the valve housing. The diaphragm 44 forms a closed chamber 46 below the diaphragm and is provided with a valve closure element 48 adapted to seat against the valve seat 38 when the diaphragm is flexed upwardly.

The diaphragm 44 is also provided with an upstanding pin 50 extending through the passage 34 and through a port 52 of slightly larger diameter than the pin. The upper end of the pin extends into a cavity 54 in which is disposed a valve closure ball 56 adapted to seat downwardly on the port 52 which forms a valve seat, and adapted to be raised off the seat by the pin 50. A compression spring 58 is biased between the ball 56 and a pipe line 60 which is fitted in the upper end of the cavity 54.

Another line 62 leads from the gas main 12 having a filter 64 interposed therein. The line 62 is also provided with an orifice 66. Leading from the line 62 is another line 68 which enters into the closed chamber 46 of the main valve 28. The line 62 continues to a valve 70 which may be termed the control valve. Attention is directed to Figures 3 and 4 which show the details of one of the many possible designs of the valve 70.

The valve 70 is a heat responsive valve and the present embodiment illustrates what is known as a Curie point valve. The valve 70 includes a housing 72 which is non-permeable and is provided with a chamber 74 adjacent the top and a smaller chamber 76 therebelow. In the chamber 74 is a permanent magnet 78 having a central opening for communication with the line 62. Space is also preferably provided around the magnet, i. e., between the magnet and the housing 72, for flow of gas. The legs of the magnet 78 are disposed downwardly and positioned below the legs is a plate like element 80 of Curie point metal. The plate 80 is provided with holes 82 which communicate with the passage 62 and with the lower chamber 76. The chamber 76 is provided with a bottom opening having a valve seat 84 and the line 62 leads therefrom and terminates in a standby pilot burner 86 disposed adjacent the main burner 14. A ball 88 is disposed in the chamber 76 in the valve and is adapted to seat on the valve seat 84 and is of lesser diameter than the transverse dimension of the chamber 76 to permit the flow of gas around the ball. The ball 88 is also of Curie point metal.

Curie point metal is a metal alloyed of various elements whereby when the metal is cooled below a certain temperature, it is permeable, that is, it will be attracted by a magnet. However, when the metal reaches a predetermined temperature it becomes non-permeable. The temperature at which the change takes place from permeability to non-permeability can be controlled by the proportion of the elements making up the compound but after the metal is alloyed the Curie point is fixed and can not be changed. While both the plate 80 and the ball 88 are Curie point metal, they have different Curie points, and as an example the plate 80 might have a Curie point in the neighborhood of 300 degrees, while the ball 88 has a Curie point in the neighborhood of 1,000 degrees. These figures are merely examples and the particular Curie points of the respective elements do not for man essential of the present invention. Suffice it to say that the Curie point of the ball 88 is considerably higher than that of the plate 80.

Leading from the oven thermostat 24 is another line 90 which may be referred to as the control pilot line and terminates in a sustaining pilot burner 92. The pilot burner 92 is disposed immediately under a portion of the Curie point plate 80 in the valve 70 so that the latter will be affected directly by the pilot burner. As mentioned above, the line 60 leads from the valve 28. Interposed in the line 60 is an orifice, or gas cock, 94. The line 60 terminates in flash pilot burners 96, 98 and 100. The flash pilot burners are arranged in a particular manner together with the other pilot burners as will be explained later. Leading from the line 60 is another line 102 terminating in a booster pilot burner 104 which is also disposed directly under a portion of the Curie point plate 80 in the valve 70.

The flash pilot burners 96, 98 and 100 are disposed in substantial alignment together with the constantly burning pilot burner 20. Disposed over the pilot burners just referred to is a flame propagation tube or flash tube 106, one form of construction of which is best illustrated in Figures 5 and 6. The tube 106 is generally U-shape in cross section having its open side disposed generally downwardly and being positioned over the aligned pilot burners. The upper side of the flame propagation tube 106 is thus closed and any gas flowing out of the pilot burners is received and temporarily maintained in the frame propagation tube. In the positioning of the tube 106, it is not necessary that the open side be positioned exactly vertical, the tube need be positioned only so that at least a portion of the gas is temporarily trapped therein. Figure 1 illustrates the flame propagation tube disposed at an inclination but the particular position of the tube may be as desired in the particular installation. Extending laterally from the lower end of the flame propagation tube 106 is a short extension 108 communicating with the main tube 106 and disposed over the standby pilot burner 86. Also extending laterally from the lower end of the tube 106 is another extension 110 communicating with the main portion of the tube and leading to and terminating adjacent the booster pilot burner 104. The booster pilot burner 104 and the sustaining pilot burner 92 are both arranged with respect to the control valve 70 that any gas flowing out of these two pilot burners will be at least temporarily retarded in the region under the upper enlarged portion of the valve so that any such gas would reach from one pilot burner to the other.

While the illustration shows the preferred form of flame propagation tube, or flash tube, other forms may be used, such as a plain tube, a slotted tube, etc.

*Operation*

Figure 1 shows all of the pilot burners lighted but it will be understood that this is merely for the purpose of indicating what the elements are. Certain of the pilot burners will be lighted only under certain conditions. The constant burning top burner pilot burner 20 as mentioned above remains constantly lighted and serves as the main pilot burner for all of the other elements of the control system.

For an explanation of the cycle of operation, assume that the oven thermostat 24 is turned off; the gas is shut off in the line 22 as well as the line 90. However, gas pressure is built up in the line 62 because this line communicates directly with the gas main 12. When the pilot burners are all out, the Curie point control valve 70 is closed. This is explained by referring to Figure 3. When the pilot burners are out the Curie point plate 80 is cooled below its Curie point and in such condition is permeable. The lines of force of the magnet 78 are then concentrated in the plate 80 and do not reach down into the ball 88. The ball is thus seated on the valve seat 84. Thus gas does not actually flow in the line 62 when the valve 70 is closed but pressure does build up in the chamber 46 in the main valve 28. This pressure is exerted on the diaphragm 44 which is raised upwardly and moves the closure element 48 to seating position on the seat 38. In this condition also the pilot burner 86 is closed because the control valve 70 is closed.

When the diaphragm 44 is thus forced to its upper position the stem 50 raises the ball 56 off of its seat and the line 60 then provides communication between the interior of the main valve 28 and the flash pilot burners 96, 98 and 100 and the booster pilot burner 104. These pilot burners are thus open but of course no gas flows therethrough at this point because the oven thermostat 24 is closed.

Another condition existing when the diaphragm 44 is raised to its upper position is that the passages 32 and 40 are closed to each other and thus the main line 22 leading to the main burner 14 is also closed.

Next, assume that the operator desires to turn on the burner and the oven thermostat 24 is opened. When the oven regulator is open gas flows through the line 90 and out of the sustaining pilot burner 92 ready to be ignited. At the same time gas flows through the line 22 into the valve 28. Up to this point the pressure developed in the valve 28 does not force the diaphragm 44 downwardly because of the reduced area on the upper side thereof. The pressure on the under side of the diaphragm in the chamber 46 continues at this point as above described. The ball 56 is off of its seat and gas in the passage 32 flows through the opening 52 and through the line 60. The gas then flows out of the flash pilot burners 96, 98 and 100, as well as the booster pilot burner 104. The gas thus flowing out of these pilot burners fills the flame propagation tube so that there is substantially a combustible mixture throughout the length of the tube. The flame thus propagates from the constantly burning pilot burner 20 through the mixture in the tube and successively lights the flash pilot burners 96, 98 and 100. At the same time the lateral extension 110 of the flame propagation tube is filled with gas from the pilot burners 100 and 104 or either of them and the flame is thus propagated from the pilot burner 100 through the extension 110 to the booster pilot burner 104. The pilot burners 104 and 92 may be disposed so closely together that flame will jump from one to the other or they may be arranged as above explained so that the gas emerged therefrom is trapped by the enlarged portion of the valve 70. In either case the pilot burner 92 is immediately lighted from the booster pilot burner 104. When the two pilot burners 104 and 92 are lighted, the Curie point plate 80 becomes heated very rapidly and when it is thus heated and reaches its Curie point it is no longer permeable and the lines of force of the magnet 78 (Figure 4) reach through the plate 80 and reach the ball 88. It will be remembered that the ball 88 has a much higher Curie point than the plate 80 and when the plate 80 reaches its Curie point the ball 88 is still cool with respect to its own Curie point. The lines of force therefore raise the ball 88 off of its seat 84. When this occurs, gas flows from the line 62 through the valve 70 and continues and emerges out of the standby pilot burner 86. Immediately upon this happening the pilot burner 86 is ignited from the pilot burner 100 in a manner similarly to the other pilot burner, namely, the gas from the pilot burner 86 fills the portion 108 of the flame propagation tube and is readily ignited from the pilot burner 100.

In the igniting cycle just described, assurance is had that the pilot burner 100 is always lighted by the time heat is applied to the control valve 70 by the booster pilot burner 104, so that the standby pilot burner 86 will be lighted (from the pilot burner 100) when the valve 70 opens thus eliminating the possibility of gas escaping through the standby pilot burner 86 as well as the main burner 14 without means for igniting it being present. Thus all these stations are lighted when the standby pilot burner 86 issues gas.

A safety feature resides in the Curie metal ball 88. If dangerously abnormal or excessive temperatures occur, the ball will heat above its Curie point, become non-permeable, and drop to close the valve.

After the control valve 70 is opened the gas in the line 62 is reduced in pressure and this reduction in pressure is transmitted to the chamber 46 whereby the diaphragm 44 is flexed downwardly by the greater pressure of the incoming gas in the passages 32 and 34. When the diaphragm is flexed downwardly the valve seat 38 is opened and there is then direct communication between the passages 34 and 40 and gas flows through the line 22 to the main burner 14. The burner is then immediately lighted by the standby pilot burner 86 and/or the pilot burner 100. Another occurrence which takes place at approximately the same time is that when the diaphragm 44 is flexed downwardly the stem 50 is moved downwardly and the ball 56 is seated on the port 52 and retained thereby the compression spring 58 which is great enough to overcome the pressure of the gas flowing through the valve 28. When the ball 56 is seated, the line 60 is cut off from the valve 28 and accordingly the flash pilot burners 96, 98 and 100 and the booster pilot burner 104 are all closed and extinguished.

The sustaining pilot burner 92 is sufficient to retain the Curie point plate 80 at or slightly above its Curie point and after the booster pilot burner 104 is extinguished the control valve 70 remains open. However, the sustaining pilot burner 92 is designed so as not to be substantially larger than that necessary for retaining the valve 70 open and having such a capacity it would require considerably more time to heat from a normally cool temperature to its Curie point. Thus, the booster pilot burner 104 aids in heating the control valve 70 to the proper temperature and opening it in a very short interval of time, and after the valve has reached that predetermined position the booster pilot burner is extinguished and the temperature of the valve does not overshoot.

After the main burner is in operation the pilot burners 20, 86 and 92 remain lighted. If the standby pilot burner 86 should happen to be extinguished the gas flowing therefrom would flow in to and fill the flame propagation tube 108, 110, and be ignited from the sustaining pilot burner 92.

An advantageous feature of the present invention is that if the operator turns off the burner by turning off the oven regulator 24 and immediately thereafter wishes to relight the burner, the burner will immediately relight. This is because after the oven regulator 24 is turned off the control valve 70 remains above its Curie point for a short interval of time and during this interval the valve remains open and the pilot burner 86 remains lighted. Thus, if the burner is turned off and immediately turned on it will be relighted by the pilot burner 86. It will be understood that the portion 110 of the flame propagation tube is arranged so that the gas will flow therein if desired from one pilot burner to the other similarly to the main portion 106. The design should be such that the sustaining pilot burner 92 reestablishes from the standby pilot burner 86. When the pilot burner 92 goes out and does not relight, the valve 70 will cool and close, and the flash system will recycle, and since the temperature of the Curie metal is near its Curie point, the valve will reopen in a very short period of time and the oven will reestablish the "on" position.

When the burner is shut off and remains shut off the control valve 70 cools below its Curie point and closes. Once more gas pressure is built up in the line 62 and chamber 46 which closes the valve 20 to the line 22 and opens the line 60 to the pilot burners. The device is thus again at the beginning of the cycle and ready for relighting.

From the above it will be evident that I have provided a novel and advantageous system whereby the control valve 70 is heated at a most rapid rate so that the burner will light in the shortest interval of time. Conversely, after the valve 70 is once heated to its predetermined temperature there remains only sufficient heat to retain it there and when the burner is turned off the control valve cools and closes in the shortest interval of time. Thus, an important factor of safety as well as speed in operation is accomplished.

It will be understood that while the valve 70 is a Curie point valve, other types of heat responsive valves can be employed; for example, bi-metals, thermocouples, charged bellows, etc.

Some changes may be made in the construction and arrangement of the parts of my device without departing from the real spirit and purpose of my invention and it is my intention to cover by my claims any modified forms of structure or use of mechanical equivalents which may be reasonably included within their scope.

I claim as my invention:

1. In a system of the type including a main burner and a pilot burner adapted to ignite the main burner, the system being operative to ignite the main burner quickly from a fuel line and to shut off the main burner promptly after loss of pilot flame, the improvement comprising; means including normally closed valve means to supply fuel to the pilot burner, the valve means having a movable element operable in response to heat applied to the valve means to open the valve means when predetermined temperature is reached, a sustaining pilot burner positioned to heat the valve means and operative alone to hold the temperature above said predetermined temperature, a booster pilot burner positioned to heat the valve means in addition to the sustaining pilot burner to cause rapid temperature rise of the valve means, and a main fuel supply valve means operable in response to heating of said first valve means to said predetermined temperature to deliver fuel to the main burner and to interrupt the supply of fuel to the booster pilot burner.

2. In a system of the type including a main burner a pilot burner adapted to ignite the main burner, the system being operative to ignite the main burner quickly from a fuel line and to shut off the main burner promptly upon loss of pilot burner flame, the improvement comprising; means including normally closed valve means to supply fuel to the pilot burner, a pair of burners positioned to heat the valve means, the valve means having a movable element operable in response to heat applied by both burners to the valve means to open the valve means when a predetermined temperature is reached, the heating ability of one of said burners being sufficient without more to hold the valve means above the predetermined temperature, and a main fuel supply valve means operable in response to heating of said first valve means to said predetermined temperature to deliver fuel to the main burner and to interrupt the fuel supply to the other of said pair of burners.

3. In a system of the type including a main burner and a pilot burner adapted to ignite the main burner, and operative to ignite the main burner quickly from a fuel line and to shut off the main burner promptly after loss of pilot flame, the improvement comprising; a pilot burner fuel supply line and a normally closed valve therein which opens in response to heat applied thereto and thereupon supplies fuel to the pilot burner, said pilot burner fuel supply line having a restriction therein to effect a substantial pressure drop in the line downstream of said restriction when the valve is open, sustaining and booster pilot burners positioned to heat the valve additively, the sustaining pilot burner alone being capable of holding the valve open, a main fuel valve which is operated by opposing pressures to selectively supply fuel to the main burner or to the booster pilot burner and is normally operable by pressure from said pilot burner fuel supply line downstream of said restriction to supply the booster pilot burner, said main valve, upon being supplied with fuel to initiate operation of the main burner, being operable to the position supplying the main burner upon occurrence of said pressure drop in said pilot burner fuel supply line.

4. In a system to ignite a main burner quickly from a fuel line and to shut off the main burner promptly upon loss of pilot flame, the improvement comprising; a pilot burner adapted to ignite the main burner, means including normally closed valve means which opens in response to heat applied thereto to supply fuel to the pilot burner, a sustaining pilot burner positioned to heat said valve means to hold the valve in opened position, a booster pilot burner positioned to heat the valve means to supplement the sustaining pilot burner, means which initially supplies fuel to the sustaining pilot burner and the booster pilot burner, and means operative in response to opening of the valve means to discontinue the booster pilot burner fuel supply.

5. In a system of the type including a main burner and a pilot burner adapted to ignite the main burner, the system being operative to ignite the main burner quickly from a fuel line and to shut off the main burner promptly after loss of pilot flame, the improvement comprising; means including normally closed valve means which opens in response to heat applied thereto to supply fuel to the pilot burner, a sustaining pilot burner positioned to heat said valve means to hold the valve in opened position, a booster pilot burner positioned to heat the valve means to supplement the sustaining pilot burner, means which initially supplies fuel to the sustaining pilot burner and the booster pilot burner, and means operative upon opening of the valve to discontinue the booster pilot burner fuel supply.

6. In a system of the type including a main burner and a pilot burner adapted to ignite the main burner, the system being operative to ignite the main burner quickly from a burner fuel line and to shut off the main burner promptly after loss of pilot flame, the improvement comprising: a second fuel line to supply fuel to the pilot burner, normally closed valve means in said second line which opens in response to heat applied to the valve means and thereby drops the pressure in said second line, a sustaining pilot burner and a booster pilot burner operable additively to heat the valve means, second valve means in said burner fuel line selectively operable to supply fuel to the booster pilot burner or to the main burner, means responsive to the pressure in said second line to the pilot burner operable to actuate said second valve means to the booster pilot-supplying position when the pressure in said second line exceeds the pressure value which exists in said second line when said first valve means is in the open position, the sustaining pilot burner being operative alone to supply sufficient heat to maintain said first valve means in the open condition.

References Cited in the file of this patent

UNITED STATES PATENTS

| Number | Name | Date |
|---|---|---|
| 1,715,650 | Fonseca | June 4, 1929 |
| 1,910,012 | Halsey | May 23, 1933 |
| 2,063,834 | Bast et al. | Dec. 8, 1936 |
| 2,087,433 | Hollman | July 20, 1937 |
| 2,098,192 | Matthews | Nov. 2, 1937 |
| 2,233,659 | Wittman | Mar. 4, 1941 |
| 2,258,924 | Brumbaugh et al. | Oct. 14, 1941 |
| 2,299,155 | Lange | Oct. 20, 1942 |
| 2,305,848 | Dobler | Dec. 22, 1942 |
| 2,443,892 | Caparone | June 22, 1948 |
| 2,483,191 | Gauger | Sept. 27, 1949 |
| 2,506,403 | Witzel | May 2, 1950 |

FOREIGN PATENTS

| Number | Country | Date |
|---|---|---|
| 406,929 | Great Britain | Mar. 8, 1934 |